United States Patent
Goel et al.

(10) Patent No.: US 10,235,264 B2
(45) Date of Patent: Mar. 19, 2019

(54) METHOD AND SYSTEM FOR MONITORING HEALTH OF A VIRTUAL ENVIRONMENT

(71) Applicant: Infosys Limited, Bangalore (IN)

(72) Inventors: Gagan Mohan Goel, Faridkot (IN); Geetika Goel, Bangalore (IN); Rajeshwari Ganesan, Bangalore (IN); Santonu Sarkar, Bangalore (IN)

(73) Assignee: Infosys Limited, Bangalore (IN)

( * ) Notice: Subject to any disclaimer, the term of this patent is extended or adjusted under 35 U.S.C. 154(b) by 206 days.

(21) Appl. No.: 14/833,683

(22) Filed: Aug. 24, 2015

(65) Prior Publication Data

US 2016/0077948 A1 Mar. 17, 2016

(30) Foreign Application Priority Data

Sep. 11, 2014 (IN) .......................... 4455/CHE/2014

(51) Int. Cl.
*G06F 11/34* (2006.01)
*G06F 9/455* (2018.01)
*G06F 11/30* (2006.01)
*G06F 11/32* (2006.01)

(52) U.S. Cl.
CPC ...... *G06F 11/3495* (2013.01); *G06F 9/45533* (2013.01); *G06F 9/45558* (2013.01); *G06F 11/301* (2013.01); *G06F 11/3006* (2013.01); *G06F 11/3024* (2013.01); *G06F 11/328* (2013.01); *G06F 2009/45591* (2013.01)

(58) Field of Classification Search
CPC .................................................. G06F 11/3495

USPC ........................................................ 714/47.1
See application file for complete search history.

(56) References Cited

U.S. PATENT DOCUMENTS

| | | | |
|---|---|---|---|
| 7,698,705 B1 | 4/2010 | Czajkowski et al. | |
| 8,209,682 B2 * | 6/2012 | Cherkasova | G06F 9/5027 718/1 |
| 8,346,933 B2 | 1/2013 | Kawato | |
| 8,387,060 B2 | 2/2013 | Pirzada et al. | |
| 8,918,784 B1 * | 12/2014 | Jorgensen | G06F 9/5077 718/1 |
| 9,524,214 B1 * | 12/2016 | Isdal | G06F 11/0751 |
| 2006/0200819 A1 * | 9/2006 | Cherkasova | G06F 9/45533 718/1 |
| 2011/0083131 A1 * | 4/2011 | Pirzada | G06F 9/45533 718/1 |
| 2011/0258621 A1 * | 10/2011 | Kern | G06F 9/5072 718/1 |

(Continued)

FOREIGN PATENT DOCUMENTS

| | | |
|---|---|---|
| EP | 1769352 B1 | 3/2013 |
| WO | 2013075640 A1 | 5/2013 |

*Primary Examiner* — Kamini B Patel
(74) *Attorney, Agent, or Firm* — LeClairRyan PLLC (57) ABSTRACT

A method and system for monitoring health of virtual environment includes receiving input data for one or more virtual machines in the virtual environment. A number of entitled CPU cycles for each of the virtual machines based on the input data are determined. A number of actual CPU cycles obtained by each of the virtual machines based on the input data are computed. The number of entitled CPU cycles is compared with the number of actual CPU cycles for each of the virtual machines. A health status of the virtual machines based on the comparison is displayed.

15 Claims, 3 Drawing Sheets

(56) References Cited

U.S. PATENT DOCUMENTS

| | | | | |
|---|---|---|---|---|
| 2011/0261055 A1* | 10/2011 | Wong | ............. | H04L 41/0609 |
| | | | | 345/440 |
| 2012/0151209 A1* | 6/2012 | Visnyak | ............. | H04L 9/3234 |
| | | | | 713/166 |
| 2012/0311475 A1* | 12/2012 | Wong | ............. | G06F 11/3003 |
| | | | | 715/772 |
| 2012/0311577 A1 | 12/2012 | Lee et al. | | |
| 2013/0091282 A1* | 4/2013 | Tontiruttananon | .... | G06F 9/5061 |
| | | | | 709/226 |
| 2013/0111476 A1 | 5/2013 | Medovich | | |
| 2013/0283090 A1* | 10/2013 | Bradley | ............. | G06F 11/0793 |
| | | | | 714/2 |
| 2015/0242226 A1* | 8/2015 | Palavalli | ............. | G06F 9/45558 |
| | | | | 718/1 |
| 2015/0295791 A1* | 10/2015 | Cropper | ............. | H04L 67/10 |
| | | | | 709/226 |
| 2016/0188370 A1* | 6/2016 | Razin | ............. | G06F 11/30 |
| | | | | 718/104 |

\* cited by examiner

METHOD AND SYSTEM FOR MONITORING HEALTH OF A VIRTUAL ENVIRONMENT

This application claims the benefit of Indian Patent Application Serial No. 4455/CHE/2014, filed Sep. 11, 2014, which is hereby incorporated by reference in its entirety.

FIELD

This technology generally relates to monitoring computing health, and more particularly, to a method and system for monitoring health of a virtual environment.

BACKGROUND

Generally, due to increase in the complexity of virtual environment within an information technology infrastructure these days, it requires significant emphasis on evolving further a real time measurement technology with predictions to quantitatively depict the health of the virtual environment. Existing techniques captures a system utilization metric to ascertain the health of a virtual environment.

System utilization is not just the most commonly available metric across all operating systems; it is most easily available to all user levels. Whether it is an application developer or a system administrator, they can look at the central processing unit (CPU) utilization on any machine and get a good understanding of the current load on the system. However, the main challenge with a CPU utilization metric is that it does not reflect the contentions existing in the system. Whenever two processes contend for the same resource, e.g. CPU cycles itself, the operating system does a time slicing and assigns CPU cycles in a specific ratio to each process.

Similarly, in the virtualized environments, virtual machines are considered as user level processes. Whenever a process of higher priority enters the system, e.g. a real time process, the hypervisor has to pause the entitlement of a virtual machine and assign the CPU cycles to the real time process. In such cases, there is a high chance of virtual machine getting into a contention with respect to CPU cycles needed. In such cases, the system utilization shows very low, but at the same time the system is in a deadlock state. This essentially means that the CPU cycles are available but can't be used for any useful purpose by any process. Repeated happening of this event indicates bad health of the system; however it will not be caught by monitoring the system utilization. In the contrary, the system will show low utilization for its virtual machines thus misleading the admin or the onlooker into believing that the system might be very efficient.

Hence, there is a need of a method and system for method and system for monitoring health of a virtual environment.

SUMMARY

Examples of this technology provide a method and system for monitoring health of a virtual environment. This provides an automated technique to system administrators which will facilitate in identification of contention cases by generating health status of virtual environment.

One example of a method for monitoring health of a virtual environment includes receiving, by a processor, input data for one or more virtual machines in the virtual environment. A number of entitled CPU cycles for each of the virtual machines based on the input data are determined by the processor. A number of actual CPU cycles obtained by each of the virtual machines based on the input data are computed by the processor. The number of entitled CPU cycles is compared by the processor with the number of actual CPU cycles for each of the virtual machines. A health status of the virtual machines based on the comparison is displayed by the processor.

Another example of a system that monitors health of a virtual environment includes a processor and a memory storing computer-executable instructions causing the computer system to receive input data for one or more virtual machines in the virtual environment; determine a number of entitled CPU cycles for each of the virtual machines based on the input data; compute a number of actual CPU cycles obtained by each of the virtual machines; compare the number of entitled CPU cycles with the number of actual CPU cycles for each of the virtual machines; and display a health status of the virtual machines based on the comparisons.

As described herein, a variety of other features and advantages can be into the technologies as desired. The foregoing and other features and advantages will become more apparent to one skilled in the art from the following detailed description of disclosed embodiments, which proceeds with reference to the accompanying drawings.

BRIEF DESCRIPTION OF THE DRAWINGS

The accompanying drawings, which constitute a part of this disclosure, illustrate various embodiments and aspects of present invention and together with the description, explain the principle of the invention.

DETAILED DESCRIPTION

Example 1

Exemplary Overview

The technologies described herein can be used for monitoring health of a virtual environment. Adoption of the technologies can provide an efficient technique for reducing instability of system due to physical hang or crash state of a virtual environment.

The technologies are targeted to significantly identify system level contentions in real time. It will also increase the scope of detecting hangs and crashes in the virtual system. This could provide the system administrator to judicially determine the health of virtual environment for transient workload conditions with contentions at hardware and software layers.

Example 2

Exemplary Method for Monitoring Health of a Virtual Environment

Figure 1:
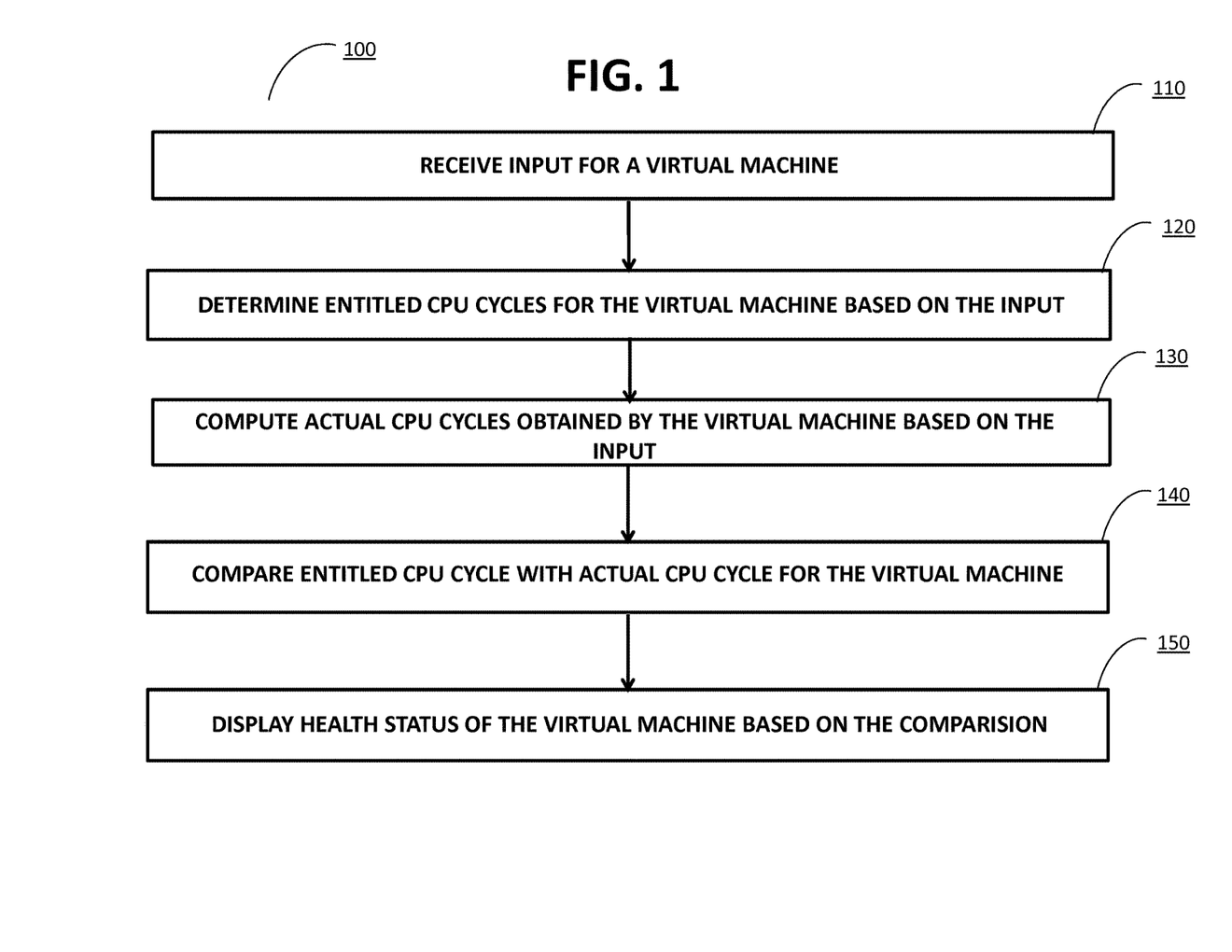
FIG. 1 is a flowchart representing steps involved in an example of a method for monitoring health of a virtual environment described herein.
Figure 2:
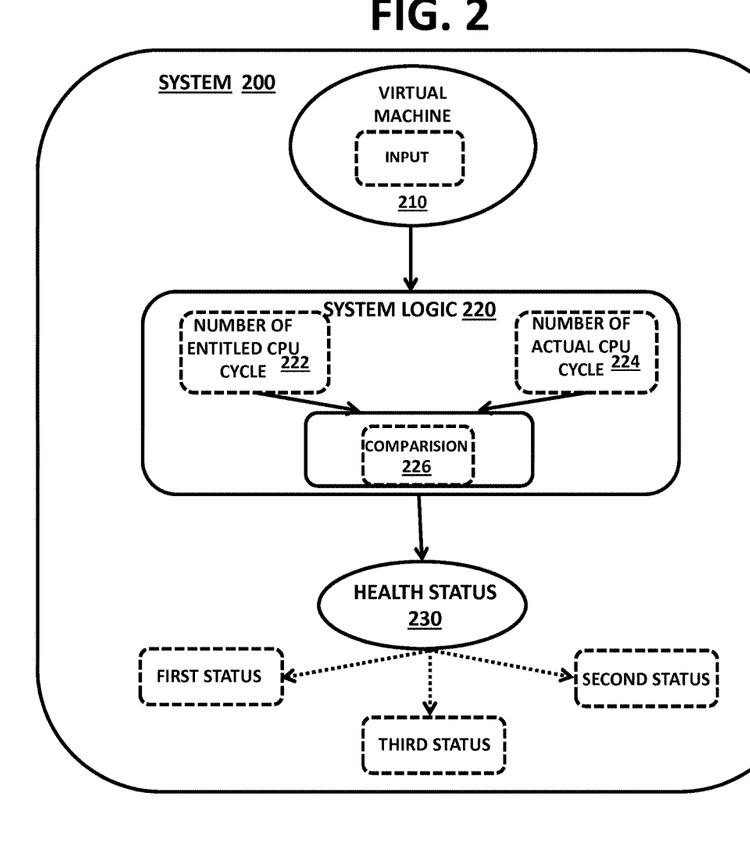
FIG. 2 is a diagrammatic representation of an exemplary system for monitoring health of a virtual environment described herein.

FIG. 1 is a flowchart of an exemplary method 100 for implementing the monitoring of health of a virtual environment as described herein and can be implemented for example in a system such as shown in FIG. 2. The technologies described herein can be generic to the specifics of operating systems or hardware and can be applied in any variety of environments to take advantage of the described features.

At step 110, an input of data for each of the virtual machines in the virtual environment is received. The input data may include a unique identifier. The name of the virtual machines in the virtual environment is input and a unique identifier is identified for each of the virtual machine. The unique identifier may include the process identity of the virtual machine. Such unique identifiers can be provided by a user or another software tool. In one of the embodiment a Linux host run the command ps, or in a Windows host, run the command tasklist to obtain the list of all processes. Numbers against the virtual machine names can also be the unique identifier for those virtual machines acting as the input.

At step 120, for each unique identifier obtained at step 110, a number of entitled CPU cycle for each of the virtual machine is determined. The entitled CPU cycles are determined based on the priority and configuration of the virtual machines in the virtual environment. The hardware configuration of the machine, host operating system, virtual machine names and the virtual machine configurations are processed. Each virtual machine appears as independent process to the host operating system. The processes can be in any one state from the ready, pending, delay or suspended state. Process scheduler considers all the processes in ready state to be in contention of CPU cycles. Generally, process scheduler evenly distributes the CPU cycles among same priority processes and allocates additional CPU cycles to high priority processes. Hence, looking at count of processes in ready state and their corresponding priority, the number of CPU cycles that each process will get can be computed. Based on the configuration and state for each virtual machine, the CPU entitlement is determined. In one of the embodiment a user defined threshold of the entitled CPU cycles and time can be configured and input by the user. Threshold is user defined and may depend on count of virtual machines deployed on single host, virtual machines criticality, defined workload SLA, and average deviation with linear workload. The threshold may include a time which is input by a user.

At step 130, for each unique identifier obtained at step 110, a number of actual CPU cycle for each of the virtual machine is computed. This may be done using a time-slice program which determines the actual time obtained by the unique identifier in kernel, user and guest levels. Using unique identifier as input data, the number of CPU cycles that process ran in each of execution levels is fetched. The actual CPU cycle for each of the virtual machine is the number of CPU cycles run in each of the kernel, user and guest levels of operation.

At step 140, the comparison is done between the number of entitled CPU cycle and the number of actual CPU cycle for each of the virtual machines in the virtual environment. Ideally, virtual machine in ready state gets enough CPU cycles to meet SLA's. Virtual machines may fail to get/use-up required CPU cycles because of shared resource contention. For example: to send data packets out of network interface, Virtual Machine process is not able to get lock on shared resource, or not able to en-queue packet to outgoing queue. In such cases, even though CPU/memory/network-utilization may show to be low, the SLAs may get impacted. For each run of check to determine the relation between entitled and actual usage of CPU-cycles, one of Health flags is set.

At step 150, the health status of the virtual machine is displayed based on the comparison done at step 140 and the user defined threshold of the entitled CPU cycle and time which may be input by a user. The health status of 3 types may be displayed. The health status is displayed as first health status which may be set as 'Warning' if the actual CPU cycles are less than the entitled CPU cycles. This indicates a possible contention in the virtual machine. The health status is displayed as the second health status which may be set as 'Healthy' if the actual CPU cycles are equal or within the user defined threshold of the entitled CPU cycles. The health status is displayed as a third health status which may be set as 'Hotspot' if the actual CPU cycles are above the user defined threshold of the entitled CPU cycles. The health status may also be displayed as a third health status which may be set as 'Hotspot' if the health status of a virtual machine has been the first health status that has been set as 'Warning' for more than the user defined threshold of time. This means the status of a virtual machine may be hotspot in case a virtual machine is in the first health status state frequently. In case a virtual machine is in third health status the virtual machine needs to be either migrated or rejuvenated for handling the contentions they are going through. In such cases repetition of the method is required.

The method 100 and any of the methods described herein can be performed by non-transitory computer-executable instructions stored in one or more non-transitory computer-readable media (storage or other tangible media) or stored in one or more non-transitory computer readable storage devices.

Example 3

Exemplary System for Monitoring Health of a Virtual Environment

FIG. 2 is a block diagram of an exemplary system 200 for implementing the monitoring of health of a virtual environment described herein. In the example, one or more computers in a computing environment implement system 200 that accepts as input for the virtual machines in the virtual environment. The input data may include a unique identifier for each virtual machine in the virtual environment. The system 200 includes system logic 220, which processes entitled CPU cycles 222 and actual CPU cycles 224 for unique identifiers 210 to provide health status of the virtual environment 230. The input unique identifier 210 may include process identity of each of the virtual machine in the virtual environment. Such unique identifiers can be provided by a user or another software tool. The system logic 220 determines the number of entitled CPU cycle 222 and the number of actual CPU cycle 224 for the unique identifiers for each of the virtual machines. The system logic 220 further compares the entitled CPU cycle 222 and the actual CPU cycle 224 to display the health status of the virtual machines in the virtual environment. The health status for the virtual machine in the virtual environment may be displayed as first health status, second health status or a third health status that can be set as 'Healthy', 'Warning', or 'Hotspot' respectively. Appropriate action can be taken by the system administrator or the user based in the displayed health status of the virtual machine for resolution the issues, if found present. The heath status can be either reports or dashboards based on the user requirements. The system 200 may also include capabilities for defining a threshold of the entitled CPU cycles by a user.

In practice, the systems shown herein, such as system 200 can be more complicated, with additional functionality, more complex inputs, and the like.

In any of the examples herein, the inputs, outputs and health status 230 can be stored in one or more non-transitory computer-readable storage media.

Example 4

Exemplary Virtual Environment and Virtual Machine

In any of the examples herein, a virtual environment may be when a hypervisor is used to create multiple operating systems on the same physical machine. This is different from the hardware partitioning to install multiple operating systems on the same machine. In the virtual environment, the hypervisor allocates the system resources like CPU and memory in a sharing mode with multiple processes. Each of the multiple processes thus created may individually be referred as Virtual machines.

Example 5

Exemplary Health Status

In any of the examples herein, a health status may be a visual model for analyzing health of virtual environment, and implementing corrective actions in need for delivering better results in the business. The displayed heath status may be predefined by a user and displayed as anyone from a first health status, a second health status or a third health status. A user may set the first health status as 'healthy', the second health status as 'warning' and the third health status as 'hotspot'.

Example 6

Exemplary General Process

The general process for health monitoring of a virtual environment is processing to compute and compare the entitled CPU cycle and the actual CPU cycle for a virtual machine with a unique identifier and the displaying its health.

In one embodiment, the input data for each of the virtual machines present in the virtual environment are received. The input data may include unique identifiers for virtual machines present in the virtual environment. The name of the virtual machines present in the environment is input. A plurality of unique identifiers corresponding to each of the virtual machine is then identified. The unique identifier is the process identity of the virtual machine. Corresponding to each of the unique identifier such obtained, the number of entitled CPU cycles for each of such virtual machine is determined. The parameters on which the entitled CPU cycles are computed are priority and configuration of the virtual machines present in the virtual environment. Each one from the hardware configuration of the machine, host operating system, virtual machine names and the virtual machine configurations are processed. The possible state in which a process can be any one from the ready, pending, delay or suspended state. The process scheduler considers all the processes which are in the ready state and in contention of CPU cycles. Generally, the process scheduler while distributing the CPU cycles to the same priority processes, distributes the CPU cycle evenly. The process scheduler may distribute additional CPU cycles to the processes which are having high priority. Hence, looking at count of processes in ready state and their corresponding priority, the number of CPU cycles that each process will get can be computed. Based on the configuration and state for each virtual machine, the CPU entitlement is computed. In an exemplary embodiment a user is able to define and configure a threshold for the entitled CPU cycles and time which are input by a user. The threshold may depend on count of virtual machines deployed on single host, virtual machines criticality, defined workload SLA, and average deviation with linear workload. For each of the received unique identifier, a number of actual CPU cycle is computed. This may be done by using a time slice program. The time slice program determines the actual time obtained by the unique identifier in kernel, user and guest level. The total number of CPU cycles that process ran in each of the execution level is fetched using for each of the unique identifier. The actual CPU cycle for each of the virtual machine is the number of CPU cycles run in each of the kernel, user and guest levels of operation. The number of entitled CPU cycles and the number of actual CPU cycles for each of the virtual machine in the virtual environment are compared. Ideally, virtual machine in ready state gets enough CPU cycles to meet SLA's. Based on the comparison done and the user defined threshold of the entitled CPU cycle and time, the health status of the virtual machine is displayed. The displayed health statuses may be of 3 types. The health status is displayed as first health status that may be set as 'Warning' if the actual CPU cycles are less than the entitled CPU cycles. This indicates a possible contention in the virtual machine. The health status is displayed as a second health status that may be set as 'Healthy' if the actual CPU cycles are equal or within the user defined threshold of the entitled CPU cycles. The health status is displayed as a third health status that may be set as 'Hotspot' if the actual CPU cycles are above the user defined threshold of the entitled CPU cycles. The health status may also be displayed as the third health status 'Hotspot' if the health status of a virtual machine has been the first health status or 'Warning' for more than the user defined threshold of time. This means the status of a virtual machine may be the third health status or hotspot in case a virtual machine is in warning state frequently In case of a third health status or hotspot health status the virtual machine needs to be either migrated or rejuvenated for handling the contentions they are going through. In such cases repetition of the method is required.

Example 7

Exemplary Computing Environment

The techniques and solutions described herein can be performed by software, hardware, or both of a computing environment, such as one or more computing devices. For example, computing devices include server computers, desktop computers, laptop computers, notebook computers, handheld devices, netbooks, tablet devices, mobile devices, PDAs, and other types of computing devices.

Figure 3:
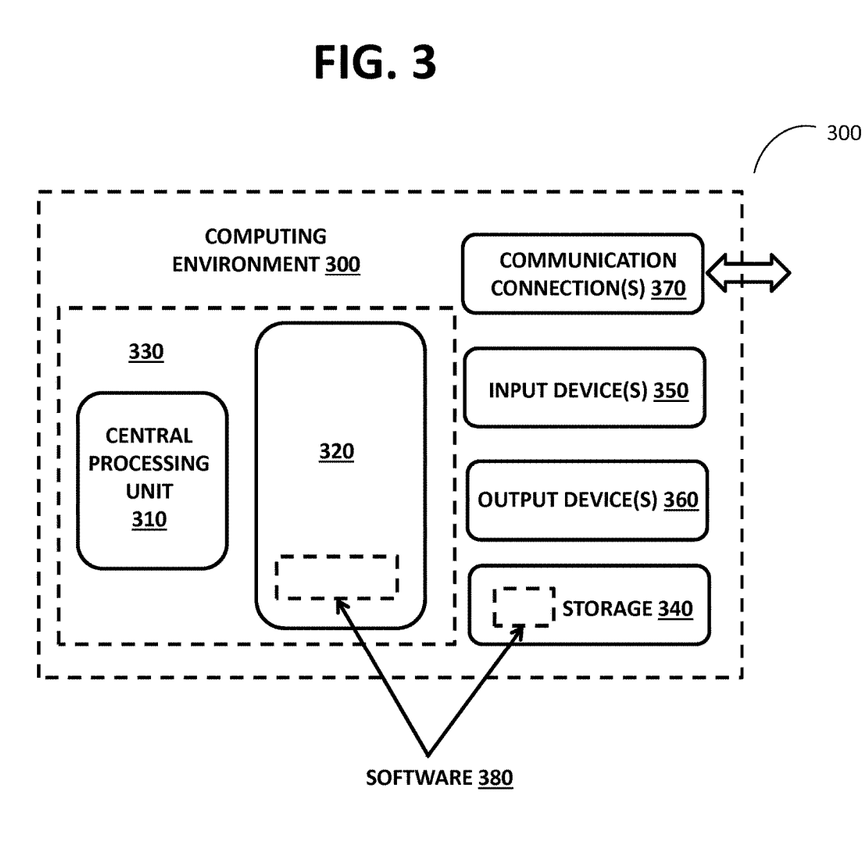
FIG. 3 is a block diagram of an exemplary computing environment suitable for implementing any of the technologies described herein.

FIG. 3 illustrates a generalized example of a suitable computing device or other environment 300, such as the illustrated virtual health monitoring computing device 300, in which this technology as illustrated and described by way of the examples herein can be implemented. The computing device 300 is not intended to suggest any limitation as to scope of use or functionality, as the technologies may be implemented in diverse general-purpose or special-purpose computing environments. For example, the disclosed technology may be implemented using a computing device comprising a processing unit, memory, and storage storing computer-executable instructions implementing the enterprise computing platform technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices With reference to FIG. 3, the computing device 300 includes at least one processing unit 310 coupled to memory 320. In FIG. 3, this basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. The memory 320 can store software 380 implementing any of the technologies described herein.

A computing device or other environment may have additional features. For example, the computing device 300 may includes storage 340, one or more input devices 350, one or more output devices 360, and one or more communication connections 370. An interconnection mechanism (not shown) such as a bus, controller, or network interconnects the components of the computing device 300. Typically, operating system software (not shown) provides an operating environment for other software executing in the computing device 300, and coordinates activities of the components of the computing device 300.

The storage 340 may be removable or non-removable, and includes magnetic disks, magnetic tapes or cassettes, CD-ROMs, CD-RWs, DVDs, or any other non-transitory computer readable media which can be used to store information and which can be accessed within the computing device 300. The storage 340 can store software 380 containing instructions for any of the technologies described herein.

The input device(s) 350 may be a touch input device such as a keyboard, mouse, pen, or trackball, a voice input device, a scanning device, or another device that provides input to the computing device 300. For audio, the input device(s) 350 may be a sound card or similar device that accepts audio input in analog or digital form, or a CD-ROM reader that provides audio samples to the computing environment. The output device(s) 360 may be a display, printer, speaker, CD-writer, or another device that provides output from the computing device 300.

The communication connection(s) 370 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Storing in Non-Transitory Computer-Readable Media

Any of the storing actions described herein can be implemented by storing in one or more non-transitory computer readable media (e.g., non-transitory computer readable storage media or other tangible media).

Any of the things described as stored can be stored in one or more non-transitory computer readable media (e.g., non-transitory computer readable storage media or other tangible media).

Methods in Non-transitory Computer Readable Media

Any of the methods described herein can be implemented by computer-executable instructions in (e.g., encoded on) one or more non-transitory computer readable media (e.g., non-transitory computer readable storage media or other tangible media). Such instructions can cause a computer to perform the method. The technologies described herein can be implemented in a variety of programming languages.

Methods in Non-transitory Computer Readable Storage Devices

Any of the methods described herein can be implemented by computer-executable instructions stored in one or more non-transitory computer readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method for improved, automated, and real-time monitoring of virtual environment health based on virtual machine resource contention, the method comprising:

determining, by a virtual health monitoring computing device, a number of entitled central processing unit (CPU) cycles for each of a plurality of virtual machines executing on a hypervisor in a virtual environment based on a state and a priority for a plurality of processes corresponding to the virtual machines;

determining, by the virtual health monitoring computing device, a number of actual CPU cycles obtained by each of the virtual machines in one or more execution levels of an operating system;

comparing, by the virtual health monitoring computing device, the number of entitled CPU cycles with the number of actual CPU cycles for each of the virtual machines; and determining, by the virtual health monitoring computing device, and outputting an indication of, one of a plurality of health statuses for each of the virtual machines based on the comparison between the number of entitled CPU cycles and the number of actual CPU cycles.

2. The method of claim 1, further comprising obtaining, by the virtual health monitoring computing device, input data for the virtual machines, wherein the input data comprises a list of process identities of the virtual machines in the virtual environment.

3. The method of claim 1, wherein the execution levels of the operating system comprise kernel, user, and guest execution levels.

4. The method of claim 1, further comprising outputting, by the virtual health monitoring computing device, the indication of the one of the plurality of health statuses for each of the virtual machines to a display device as a first health status, a second health status, or a third health status according to whether the actual CPU cycles are less than the entitled CPU cycles, the actual CPU cycles are greater than the entitled CPU cycles, or the actual CPU cycles are equal to, or within a CPU cycle threshold of, the entitled CPU cycles, respectively.

5. The method of claim 4, further comprising:

determining, by the virtual health monitoring computing device, when the health status comprises the first health status for more than a time threshold for one of the virtual machines; and converting, by the virtual health monitoring computing device, the first health status to the third health status for the one of the virtual machines, when the determination indicates that the health status comprises the first health status for more than the time threshold for the one of the virtual machines.

6. A virtual health monitoring computing device comprising:

one or more processors; and a memory comprising programmed instructions stored thereon, the memory coupled to the one or more processors which are configured to be capable of executing the stored programmed instructions to:

determine a number of entitled central processing unit (CPU) cycles for each of a plurality of virtual machines executing on a hypervisor in a virtual environment based on a state and a priority for a plurality of processes corresponding to the virtual machines;

determine a number of actual CPU cycles obtained by each of the virtual machines in one or more execution levels of an operating system;

compare the number of entitled CPU cycles with the number of actual CPU cycles for each of the virtual machines; and determine, and output an indication of, one of a plurality of health statuses for each of the virtual machines based on the comparison between the number of entitled CPU cycles and the number of actual CPU cycles.

7. The device of claim 6, wherein the one or more processors are further configured to be capable of executing the stored programmed instructions to obtain input data for the virtual machines, wherein the input data comprises a list of process identities of the virtual machines in the virtual environment.

8. The device of claim 6, wherein the execution levels of the operating system comprise kernel, user, and guest execution levels.

9. The device of claim 6, wherein the one or more processors are further configured to be capable of executing the stored programmed instructions to output the indication of the one of the plurality of health statuses for each of the virtual machines to a display device as a first health status, a second health status, or a third health status according to whether the actual CPU cycles are less than the entitled CPU cycles, the actual CPU cycles are greater than the entitled CPU cycles, or the actual CPU cycles are equal to, or within a CPU cycle threshold of, the entitled CPU cycles, respectively.

10. The device of claim 9, wherein the one or more processors are further configured to be capable of executing the stored programmed instructions to:

determine when the health status comprises the first health status for more than a time threshold for one of the virtual machines; and convert the first health status to the third health status for the one of the virtual machines, when the determination indicates that the health status comprises the first health status for more than the time threshold for the one of the virtual machines.

11. A non-transitory computer readable medium having stored thereon instructions for improved, automated, and real-time monitoring of virtual environment health based on virtual machine resource contention, comprising machine executable code that, when executed by a processor, causes the processor to:

determine a number of entitled central processing unit (CPU) cycles for each of a plurality of virtual machines executing on a hypervisor in a virtual environment based on a state and a priority for a plurality of processes corresponding to the virtual machines;

determine a number of actual CPU cycles obtained by each of the virtual machines in one or more execution levels of an operating system;

compare the number of entitled CPU cycles with the number of actual CPU cycles for each of the virtual machines; and determine, and output an indication of, one of a plurality of health statuses for each of the virtual machines based on the comparison between the number of entitled CPU cycles and the number of actual CPU cycles.

12. The non-transitory computer readable medium of claim 11, wherein the machine executable code, when executed by the processor, further causes the processor to obtain input data for the virtual machines, wherein the input data comprises a list of process identities of the virtual machines in the virtual environment.

13. The non-transitory computer readable medium of claim 11, wherein the execution levels of the operating system comprise kernel, user, and guest execution levels.

14. The non-transitory computer readable medium of claim 11, wherein the machine executable code, when executed by the processor, further causes the processor to output the indication of the one of the plurality of health statuses for each of the virtual machines to a display device as a first health status, a second health status, or a third health status according to whether the actual CPU cycles are less than the entitled CPU cycles, the actual CPU cycles are greater than the entitled CPU cycles, or the actual CPU cycles are equal to, or within a CPU cycle threshold of, the entitled CPU cycles, respectively.

15. The non-transitory computer readable medium of claim 14, wherein the machine executable code, when executed by the processor, further causes the processor to:
   determine when the health status comprises the first health status for more than a time threshold for one of the virtual machines; and
   convert the first health status to the third health status for the one of the virtual machines, when the determination indicates that the health status comprises the first health status for more than the time threshold for the one of the virtual machines.

* * * * *